United States Patent
Newman

(10) Patent No.: US 12,189,623 B2
(45) Date of Patent: Jan. 7, 2025

(54) SYSTEMS AND METHODS FOR DATA MANAGEMENT AND QUERY OPTIMIZATION

(71) Applicant: Sentinel Labs Israel Ltd., Tel Aviv (IL)

(72) Inventor: Steve Newman, Portola Valley, CA (US)

(73) Assignee: Sentinel Labs Israel Ltd., Tel Aviv (IL)

( * ) Notice: Subject to any disclaimer, the term of this patent is extended or adjusted under 35 U.S.C. 154(b) by 0 days.

(21) Appl. No.: 18/154,559

(22) Filed: Jan. 13, 2023

(65) Prior Publication Data

US 2023/0229658 A1 Jul. 20, 2023

Related U.S. Application Data

(60) Provisional application No. 63/299,569, filed on Jan. 14, 2022.

(51) Int. Cl.
*G06F 16/2453* (2019.01)
*G06F 16/2455* (2019.01)
*G06F 16/25* (2019.01)

(52) U.S. Cl.
CPC .. *G06F 16/24539* (2019.01); *G06F 16/24561* (2019.01)

(58) Field of Classification Search
CPC ............. G06F 16/182; G06F 16/24539; G06F 16/24561; G06F 16/256; G06F 16/24552
See application file for complete search history.

(56) References Cited

U.S. PATENT DOCUMENTS

| | | | | |
|---|---|---|---|---|
| 6,026,474 A * | 2/2000 | Carter | ..................... | H04L 67/02 |
| | | | | 711/E12.066 |
| 7,975,018 B2 * | 7/2011 | Unrau | ................... | H04L 67/568 |
| | | | | 709/215 |
| 11,734,303 B2 * | 8/2023 | Cruanes | ................ | G06F 16/254 |
| | | | | 707/770 |
| 2011/0252434 A1 * | 10/2011 | Stokes | ..................... | G06F 16/10 |
| | | | | 719/318 |
| 2015/0268989 A1 * | 9/2015 | Busch | ................... | G06F 9/5016 |
| | | | | 711/103 |
| 2019/0138639 A1 * | 5/2019 | Pal | ......................... | G06F 16/211 |
| 2019/0294614 A1 * | 9/2019 | Brodt | .................... | G06F 16/273 |
| 2020/0050586 A1 * | 2/2020 | Pal | ........................ | G06F 16/1734 |
| 2020/0133865 A1 * | 4/2020 | Mannava | ............ | G06F 12/1009 |
| 2021/0117232 A1 * | 4/2021 | Sriharsha | ............ | G06F 16/1734 |

* cited by examiner

*Primary Examiner* — Dennis Truong
(74) *Attorney, Agent, or Firm* — Perkins Coie LLP

(57) ABSTRACT

A central node can: receive a query comprising at least one parameter comprising a time range of a dataset stored in a cloud storage system; transmit one or more of the query parameters comprising the time range to a metadata service; receive from the metadata service a list of files related to the query; and assign to each processing node of a plurality of processing nodes a subset of the files. Each processing node can: determine that the subset is not stored on a cache; retrieving the subset not stored on the cache from the cloud storage system; store the retrieved subset in a local memory; scan the subset stored in the local memory for data matching the at least one parameter to generate a subset of query results; and concurrently copy using a separate thread from the scanning, the subset stored in the local memory to the cache.

12 Claims, 9 Drawing Sheets

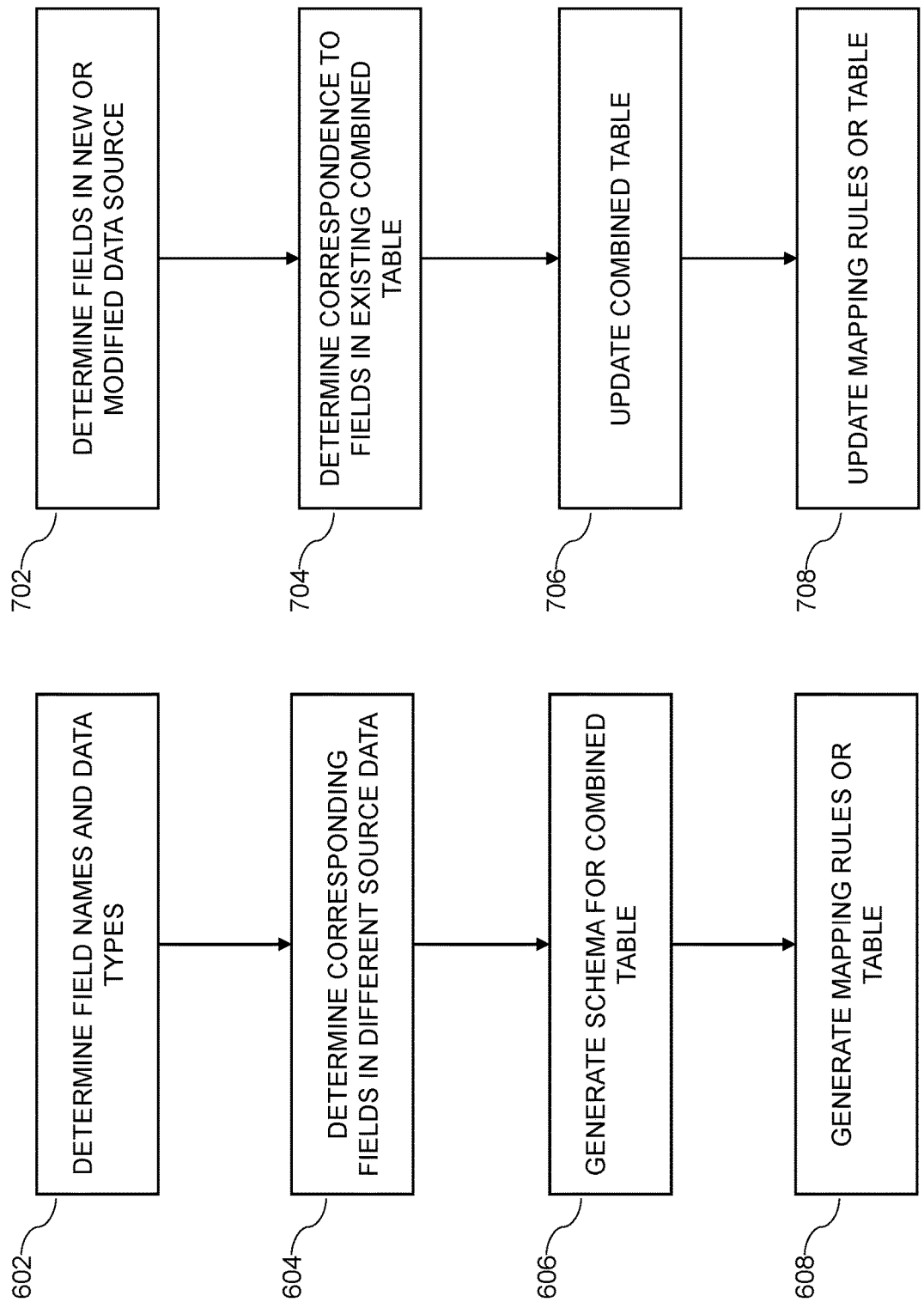

SYSTEMS AND METHODS FOR DATA MANAGEMENT AND QUERY OPTIMIZATION

INCORPORATION BY REFERENCE TO ANY PRIORITY APPLICATIONS

This application claims the benefit of U.S. Provisional Application No. 63/299,569, entitled "SYSTEMS AND METHODS FOR DATA MANAGEMENT AND QUERY OPTIMIZATION," filed Jan. 14, 2022, the contents of which are incorporated by reference herein in their entirety.

Any and all applications for which a foreign or domestic priority claim is identified in the Application Data Sheet as filed with the present application are hereby incorporated by reference under 37 CFR 1.57.

BACKGROUND

Field

The embodiments herein are generally directed to systems and methods for data management and query optimization.

Description of Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

It can be important to optimize data storage, caching, and querying systems and methods in order to improve performance and reduce costs. Current approaches, such as maintaining locally cached copies, can offer many benefits. However, there can be significant drawbacks, such as stale data, bottlenecks resulting from slow write and read speeds, and so forth. Moreover, data can often come from different sources and have different formats, which can present challenges for efficiently storing and querying data.

SUMMARY

For purposes of this summary, certain aspects, advantages, and novel features of the invention are described herein. It is to be understood that not all such advantages necessarily may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

In some aspects, the techniques described herein relate to a computer-implemented method for optimizing query processing in a cloud database storage system using a best-effort cache population, the computer-implemented method including: receiving, by a central coordinating node from a query source, a query of a dataset stored in the cloud database storage system, wherein the query includes at least one query parameters, wherein the at least one query parameters includes a time range; transmitting, by the central coordinating node to a metadata service, one or more query parameters of the at least one query parameters, wherein the one or more transmitted query parameters includes the time range; receiving, by the central coordinating node from the metadata service, a list including a plurality of files related to the query, wherein each file of the plurality of files related to the query is selected from the time range; distributing, by the central coordinating node to a plurality of processing nodes, the plurality of files related to the query, wherein each processing node of the plurality of processing nodes is assigned a corresponding subset of the plurality of files, and wherein each processing node of the plurality of processing nodes includes a cache of recently queried files and/or recently generated files of the cloud database storage system; determining, by each of the plurality of processing nodes, whether the corresponding subset of the plurality of files is stored on the cache; if the corresponding subset of the plurality of files is not stored on the cache: retrieving, by each of the plurality of processing nodes, the corresponding subset of the plurality of files not stored on the cache from the cloud database storage system; storing, by each of the plurality of processing nodes, the retrieved corresponding subset of the plurality of files in a local memory corresponding to each of the plurality of processing nodes; scanning, by each of the plurality of processing nodes, the corresponding subset of the plurality of files stored in the local memory for data matching the at least one query parameters to generate a subset of query results; and copying, concurrently with the scanning and using a separate processing thread from the scanning, the corresponding subset of the plurality of files stored in the local memory to the cache; if the corresponding subset of the plurality of files is stored on the cache: scanning, by each of the plurality of processing nodes, the corresponding subset of the plurality of files stored on the cache for data matching the at least one query parameters to generate the subset of query results; transmitting, from each of the plurality of processing nodes to the central coordinating node, the subset of query results; aggregating, by the central coordinating node, each subset of query results from each of the plurality of processing nodes to generate a final query result; and transmitting, by the central coordinating node to the query source, the final query result, wherein the central coordinating node and each of the plurality of processing nodes include a processor and computer-readable memory.

In some aspects, the techniques described herein relate to a method, further including determining whether the scanning of the corresponding subset of the plurality of files is complete.

In some aspects, the techniques described herein relate to a method, further including: determining that the scanning of the corresponding subset of the plurality of files is complete; determining whether the copying of the corresponding subset of the plurality of files is complete; and if copying is not determined to be complete: abandoning the copying; and discarding the subset of the plurality of files from the local memory.

In some aspects, the techniques described herein relate to a method, further including determining that the scanning of the corresponding subset of the plurality of files is not complete; determining whether the copying of the corresponding subset of the plurality of files is complete; and if copying is not determined to be complete: discarding the subset of the plurality of files from the local memory.

In some aspects, the techniques described herein relate to a method, wherein the cache is stored in a local storage drive in communication with a corresponding node.

In some aspects, the techniques described herein relate to a method, wherein the cache is stored on a file server or a network attached storage (NAS) device.

In some aspects, the techniques described herein relate to a method, wherein the cloud database storage system includes Amazon Simple Storage Service (S3).

In some aspects, the techniques described herein relate to a method, wherein the local storage device includes an SSD device.

In some aspects, the techniques described herein relate to a method, wherein the local memory includes random access memory (RAM).

In some aspects, the techniques described herein relate to a method, wherein the plurality of processing nodes include epoch readers.

In some aspects, the techniques described herein relate to a computer system for optimizing query processing in a cloud database storage system using a best-effort cache population, the system including: a central coordinating processing node and a plurality of processing nodes; one or more non-transitory computer storage media in communication with the central coordinating processing node and/or the plurality of processing nodes and configured to store computer-executable instructions that when executed by the central coordinating processing node and/or the plurality of processing nodes, cause the central coordinating processing node and/or the plurality of processing nodes to: receive, by the central coordinating processing node from a query source, a query of a dataset stored in the cloud database storage system, wherein the query includes at least one query parameters, wherein the at least one query parameters includes a time range; transmit, by the central coordinating processing node to a metadata service, one or more query parameters of the at least one query parameters, wherein the one or more transmitted query parameters includes the time range; receive, by the central coordinating processing node from the metadata service, a list including a plurality of files related to the query, wherein each file of the plurality of files related to the query is selected from the time range; distribute, by the central coordinating processing node to the plurality of processing nodes, the plurality of files related to the query, wherein each processing node of the plurality of processing nodes is assigned a corresponding subset of the plurality of files, and wherein each processing node of the plurality of processing nodes includes a cache of recently queried files and/or recently generated files of the cloud database storage system; determine, by each of the plurality of processing nodes, whether the corresponding subset of the plurality of files is stored on the cache; if the corresponding subset of the plurality of files is not stored on the cache: retrieve, by each of the plurality of processing nodes, the corresponding subset of the plurality of files not stored on the cache from the cloud database storage system; store, by each of the plurality of processing nodes, the retrieved corresponding subset of the plurality of files in a local memory corresponding to each of the plurality of processing nodes; scan, by each of the plurality of processing nodes, the corresponding subset of the plurality of files stored in the local memory for data matching the at least one query parameters to generate a subset of query results; and copy, concurrently with the scanning and using a separate processing thread from the scanning, the corresponding subset of the plurality of files stored in the local memory to the cache; if the corresponding subset of the plurality of files is stored on the cache: scan, by each of the plurality of processing nodes, the corresponding subset of the plurality of files stored on the cache for data matching the at least one query parameters to generate the subset of query results; transmit, from each of the plurality of processing nodes to the central coordinating processing node, the subset of query results; aggregate, by the central coordinating processing node, each subset of query results from each of the plurality of processing nodes to generate a final query result; and transmit, by the central coordinating processing node to the query source, the final query result.

In some aspects, the techniques described herein relate to a system, wherein the computer-readable instructions further cause the central coordinating processing node and/or the plurality of processing nodes to determine whether the scanning of the corresponding subset of the plurality of files is complete.

In some aspects, the techniques described herein relate to a system, wherein the computer-readable instructions further cause the central coordinating processing node and/or the plurality of processing nodes to: determine that the scanning of the corresponding subset of the plurality of files is complete; determine whether the copying of the corresponding subset of the plurality of files is complete; and if copying is not determined to be complete: abandon the copying; and discard the subset of the plurality of files from the local memory.

In some aspects, the techniques described herein relate to a system, wherein the computer-readable instructions further cause the central coordinating processing node and/or the plurality of processing nodes to: determine that the scanning of the corresponding subset of the plurality of files is not complete; determine whether the copying of the corresponding subset of the plurality of files is complete; and if copying is not determined to be complete: discard the subset of the plurality of files from the local memory.

In some aspects, the techniques described herein relate to a method, wherein the cache is stored in a local storage drive in communication with a corresponding node.

In some aspects, the techniques described herein relate to a system, wherein the cache is stored on a file server or a network attached storage (NAS) device.

In some aspects, the techniques described herein relate to a system, wherein the cloud database storage system includes Amazon S3.

In some aspects, the techniques described herein relate to a system, wherein the local storage device includes an SSD device.

In some aspects, the techniques described herein relate to a system, wherein the local memory includes random access memory (RAM).

In some aspects, the techniques described herein relate to a system, wherein the plurality of processing nodes include epoch readers.

In some aspects, the techniques described herein relate to a computer-implemented method for optimizing query processing in a cloud database storage system using preferential caching of file headers, the computer-implemented method including: separating, by a computer system, a data file stored on the cloud database storage system into a plurality of distinct files, at least one file of the plurality of distinct files including a header file including a header of the data file and at least one other file of the plurality of distinct files including at least one segment of the data file, wherein the header of the data file includes at least one data structure that summarizes the records within the data file and within each segment of the at least one segment of the data file; storing, by the computer system, the at least one file on a local disk, wherein the at least one other file of the plurality of distinct files is not stored on the local disk; receiving, by the computer system from a query source, a query of a dataset including the data file stored on the cloud database storage system, wherein the query includes one or more query parameters; accessing, by the computer system, the at least one file stored on the local disk to analyze the at least one data structure summarizing the records within the data file and within each segment of the at least one segment of the data file; determining, by the computer system using the at least one data structure, whether the at least one other file of the plurality of distinct files or the at least one segment of the data file matches the one or more parameters; if the at least one other file of the plurality of distinct files or the at least one segment of the data file matches the one or more query parameters: downloading, by the computer system, the at least one other file of the plurality of distinct files or the at least one segment of the data file that matches the one or more query parameters; if the at least one other file of the plurality of distinct files or the at least one segment of the data file does not match the one or more query parameters: omitting retrieval, by the computer system, of the at least one other file of the plurality of distinct files or the at least one segment of the data file that does not match the one or more query parameters; aggregating, by the computer system, the plurality of distinct files or the at least one segment of the data file that matches the one or more query parameters to generate a final query result; and transmitting, by the computer system, the final query result to the query source, wherein the computer system includes a processor and computer-readable memory.

In some aspects, the techniques described herein relate to a method, wherein each segment is stored in a separate file of the at least one file of the plurality of distinct files.

In some aspects, the techniques described herein relate to a method, wherein each file of the at least one file of the plurality of distinct files stores multiple segments.

In some aspects, the techniques described herein relate to a method, wherein each segment contains a predetermined number of database records.

In some aspects, the techniques described herein relate to a method, wherein each segment is compressed.

In some aspects, the techniques described herein relate to a method, wherein the at least one other file of the plurality of distinct files is stored on a file server or network attached storage (NAS) device.

In some aspects, the techniques described herein relate to a method, wherein the at least one data structure includes a probabilistic data structure.

In some aspects, the techniques described herein relate to a method, wherein the cloud database storage system includes Amazon Simple Storage Service (S3).

In some aspects, the techniques described herein relate to a method, wherein the local disk includes an SSD device.

In some aspects, the techniques described herein relate to a computer system for optimizing query processing in a cloud database storage system using preferential caching of file headers, the system including: a hardware processor; a non-transitory computer storage medium in communication with the hardware processor and to store computer-executable instructions that when executed by the hardware processor, cause the hardware processor to: separate a data file stored on the cloud database storage system into a plurality of distinct files, at least one file of the plurality of distinct files including a header file including a header of the data file and at least one other file of the plurality of distinct files including at least one segment of the data file, wherein the header of the data file includes at least one data structure that summarizes the records within the data file and within each segment of the at least one segment of the data file; store the at least one file on a local disk, wherein the at least one other file of the plurality of distinct files is not stored on the local disk; receive from a query source, a query of a dataset including the data file stored on the cloud database storage system, wherein the query includes one or more query parameters; access the at least one file stored on the local disk to analyze the at least one data structure summarizing the records within the data file and within each segment of the at least one segment of the data file; determine, using the at least one data structure, whether the at least one other file of the plurality of distinct files or the at least one segment of the data file matches the one or more parameters; if the at least one other file of the plurality of distinct files or the at least one segment of the data file matches the one or more query parameters: download the at least one other file of the plurality of distinct files or the at least one segment of the data file that matches the one or more query parameters; if the at least one other file of the plurality of distinct files or the at least one segment of the data file does not match the one or more query parameters: omit retrieval of the at least one other file of the plurality of distinct files or the at least one segment of the data file that does not match the one or more query parameters; aggregate the plurality of distinct files or the at least one segment of the data file that matches the one or more query parameters to generate a final query result; and transmit the final query result to the query source.

In some aspects, the techniques described herein relate to a system, wherein each segment is stored in the at least one file of the plurality of distinct files.

In some aspects, the techniques described herein relate to a system, wherein multiple segments are stored in the at least one file of the plurality of distinct files.

In some aspects, the techniques described herein relate to a system, wherein some of the segments are stored in the at least one file of the plurality of distinct files.

In some aspects, the techniques described herein relate to a system, wherein each segment contains a predetermined number of database records.

In some aspects, the techniques described herein relate to a system, wherein each segment can be compressed.

In some aspects, the techniques described herein relate to a system, wherein the at least one other file of the plurality of distinct files is stored on a file server or network attached storage (NAS) device.

In some aspects, the techniques described herein relate to a system, wherein the at least one data structure includes a probabilistic data structure.

In some aspects, the techniques described herein relate to a system, wherein the cloud database storage system includes Amazon Simple Storage Service (S3).

In some aspects, the techniques described herein relate to a system, wherein the local disk includes an SSD device.

In some aspects, the techniques described herein relate to a computer-implemented method for optimizing query processing in a cloud database storage system using a query no-matches cache, the computer-implemented method including: receiving, by a computer system from a first query source, a first query of a dataset stored on the cloud database storage system, wherein the query includes at least one query parameter; scanning, by the computer system, a plurality of files stored in the dataset stored on the cloud database storage system; determining, by the computer system, whether each file of the plurality of files matches the at least one query parameter; if the computer system determines that a first file of the plurality of files does not match the at least one query parameter, determining, by the computer system, whether the first file is capable of modification; if the computer system determines that the first file is not capable of modification, recording, by the computer system in a record, that the first file does not match the first query; receiving, by the computer system from a second query source, a second query of the dataset stored on the cloud database storage system, wherein the second query includes the at least one query parameter; determining, by the computer system, that the first file is listed in the record; and omitting, by the computer system, the first file from processing of the second query, wherein the computer system includes a processor and memory.

In some aspects, the techniques described herein relate to a method, wherein the record includes a database, flat file, or JSON file.

In some aspects, the techniques described herein relate to a method, wherein the recording is in a format including {query, file} pairs.

In some aspects, the techniques described herein relate to a method, wherein determining, by the computer system, whether the first file is capable of modification includes determining whether the first file contains a maximum number of database records or whether the first file has a maximum file size.

In some aspects, the techniques described herein relate to a method, wherein the first query and the second query include the same query parameters including the at least one query parameter.

In some aspects, the techniques described herein relate to a method, wherein the second query includes at least one other query parameter, and wherein the first query does not include the at least one query parameter.

In some aspects, the techniques described herein relate to a method, wherein the record is stored in a local storage drive.

In some aspects, the techniques described herein relate to a method, wherein the cloud database storage system includes Amazon S3.

In some aspects, the techniques described herein relate to a method, wherein the first query source is the same as the second query source.

In some aspects, the techniques described herein relate to a method, wherein the first query source is different than the second query source.

In some aspects, the techniques described herein relate to a computer system for optimizing query processing in a cloud database storage system using a best-effort cache population, the system including: a hardware processor; a non-transitory computer storage medium in communication with the hardware processor and to store computer-executable instructions that when executed by the hardware processor, cause the hardware processor to: receive, from a first query source, a first query of a dataset stored on the cloud database storage system, wherein the query includes at least one query parameter; scan a plurality of files stored in the dataset stored on the cloud database storage system; determine whether each file of the plurality of files matches the at least one query parameter; if it is determined that a first file of the plurality of files does not match the at least one query parameter, determine whether the first file is capable of modification; if it is determined that the first file is not capable of modification, record, in a record, that the first file does not match the first query; receive, from a second query source, a second query of the dataset stored on the cloud database storage system, wherein the second query includes the at least one query parameter; determine that the first file is listed in the record; and omit the first file from processing of the second query.

In some aspects, the techniques described herein relate to a system, wherein the record includes a database, flat file, or JSON file.

In some aspects, the techniques described herein relate to a system, wherein the recording is in a format including {query, file} pairs.

In some aspects, the techniques described herein relate to a system, wherein determining, by the computer system, whether the first file is capable of modification includes determining whether the first file contains a maximum number of database records or whether the first file has a maximum file size.

In some aspects, the techniques described herein relate to a system, wherein the first query and the second query include the same query parameters including the at least one query parameter.

In some aspects, the techniques described herein relate to a system, wherein the second query includes at least one other query parameter, and wherein the first query does not include the at least one query parameter.

In some aspects, the techniques described herein relate to a system, wherein the record is stored in a local storage drive.

In some aspects, the techniques described herein relate to a system, wherein the cloud database storage system includes Amazon S3.

In some aspects, the techniques described herein relate to a system, wherein the first query source is the same as the second query source.

In some aspects, the techniques described herein relate to a system, wherein the first query source is different than the second query source.

In some aspects, the techniques described herein relate to a computer-implemented method for querying data including: receiving, by a computer system, a query, wherein the query includes a logical field name, a database name and a database table name; analyzing, by the computer system, the query to determine the logical field name specified by the query; determining, by the computer system, one or more physical fields associated with the logical field name specified by the query, wherein each physical field of the one or more physical fields includes a column in a columnar database table, wherein a name of each of the one or more physical fields includes the logical field name and a type code, wherein the type code indicates a data type for data stored in the physical field, and wherein determining the one or more physical fields includes executing a field identification query on a database having the database name; translating, by the computer system, the received query to a translated query, the translated query replacing the logical field name specified by the query with the one or more physical fields associated with the logical field; and executing, by the computer system, the translated query to query a database table having the database table name and one or more physical field names corresponding to the logical field name, wherein the query is executed on a columnar database including the columnar database table, wherein the computer system includes one or more processors and a non-volatile storage medium.

In some aspects, the techniques described herein relate to a computer-implemented method, wherein translating the query further includes: determining, by the computer system from the received query, a specified criteria value associated with the logical field name; determining, by the computer system, a data type associated with the specified criteria value; determining, by the computer system, that a physical field has a data type that is different from the data type associated with the specified criteria value; and excluding, by the computer system, the physical field from the translated query.

In some aspects, the techniques described herein relate to a computer-implemented method, wherein executing the field identification query includes querying a database table that includes data for mapping logical field names to physical field names.

In some aspects, the techniques described herein relate to a computer-implemented method, wherein executing the field identification query includes querying metadata associated with the database table.

In some aspects, the techniques described herein relate to a computer-implemented method, wherein translating the received query includes: determining, by the computer system from the received query, a specified criteria value associated with the logical field name; determining, by the computer system, a conversion rule for the specified criteria value associated with the logical field name; and modifying, by the computer system based on the conversion rule, the specified criteria value associated with the logical field name.

In some aspects, the techniques described herein relate to a computer-implemented method, wherein modifying the specified criteria value includes at least one of: converting the specified criteria value to a different data type or negating the specified criteria value.

In some aspects, the techniques described herein relate to a system for querying data including: a hardware processor; a non-transitory computer storage medium in communication with the hardware processor and to store computer-executable instructions that when executed by the hardware processor, cause the hardware processor to: receive a query, wherein the query includes a logical field name, a database name and a database table name; analyze the query to determine the logical field name specified by the query; determine one or more physical fields associated with the logical field name specified by the query, wherein each physical field of the one or more physical fields includes a column in a columnar database table, wherein a name of each of the one or more physical fields includes the logical field name and a type code, wherein the type code indicates a data type for data stored in the physical field, and wherein determining the one or more physical fields includes executing a field identification query on a database having the database name; translate the received query to a translated query, the translated query replacing the logical field name specified by the query with the one or more physical fields associated with the logical field; and execute the translated query to query a database table having the database table name and one or more physical field names corresponding to the logical field name, wherein the query is executed on a columnar database including the columnar database table.

In some aspects, the techniques described herein relate to a system, wherein executing the field identification query includes querying a database table that includes data for mapping logical field names to physical field names.

In some aspects, the techniques described herein relate to a system, wherein executing the field identification query includes querying metadata associated with the database table.

In some aspects, the techniques described herein relate to a system, wherein translating the received query includes: determining, by the computer system from the received query, a specified criteria value associated with the logical field name; determining, by the computer system, a conversion rule for the specified criteria value associated with the logical field name; and modifying, by the computer system based on the conversion rule, the specified criteria value associated with the logical field name.

In some aspects, the techniques described herein relate to a system, wherein modifying the specified criteria value associated with the logical field name includes at least one of: converting the specified criteria value to a different data type or negating the specified criteria value.

BRIEF DESCRIPTION OF THE DRAWINGS

The drawings are provided to illustrate example embodiments and are not intended to limit the scope of the disclosure. A better understanding of the systems and methods described herein will be appreciated upon reference to the following description in conjunction with the accompanying drawings, wherein:

FIG. 6 is a flowchart illustrating an example process for creating a table for storing data which can be run on a computing system according to some embodiments.

FIG. 7 is a flowchart that illustrates an example processing for updating an existing combined table according to some embodiments.

DETAILED DESCRIPTION

Figure 1:
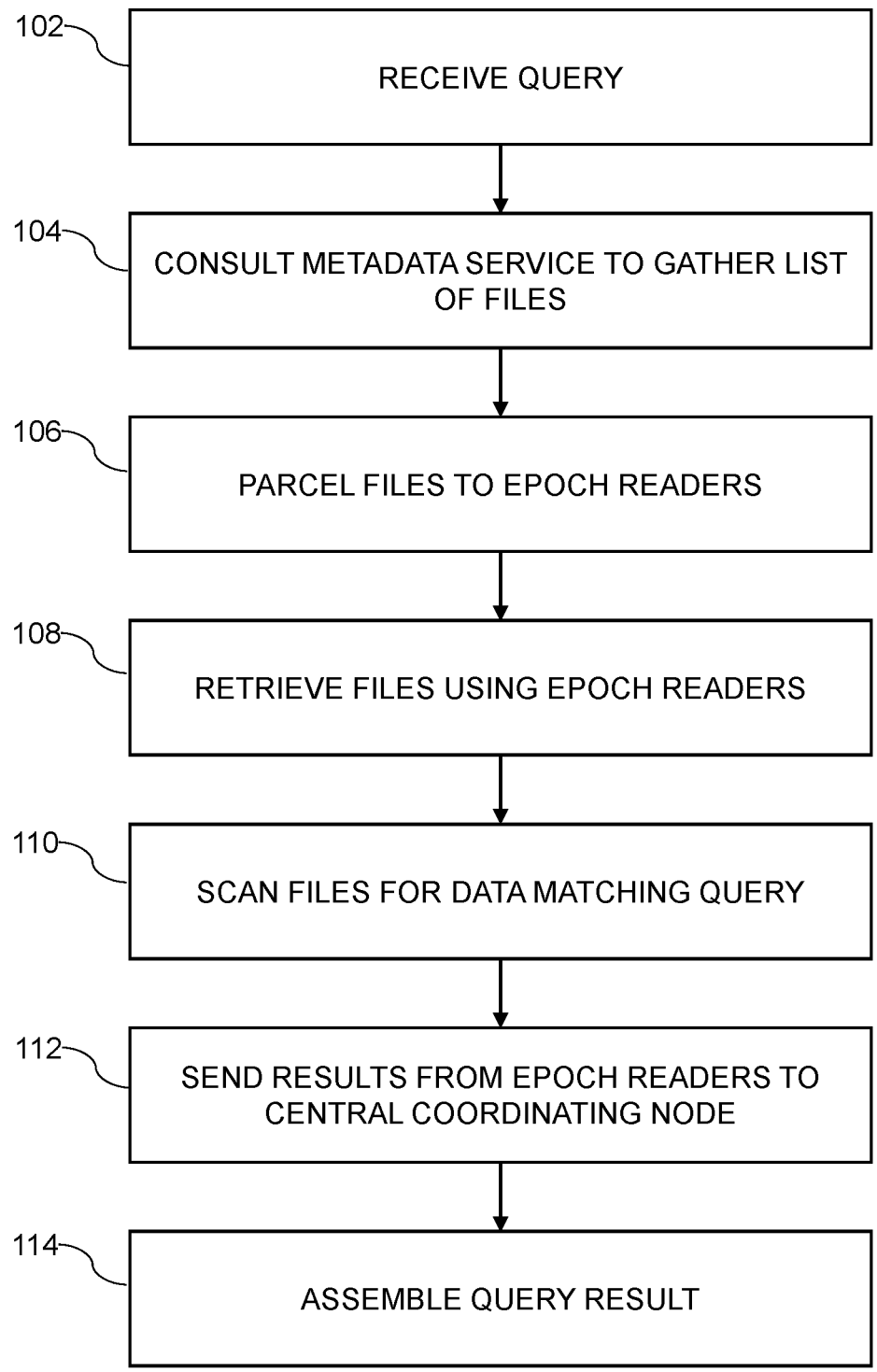
FIG. 1 is a flowchart that illustrates an example process for executing a query according to some embodiments.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present technology.

Best-Effort Cache Population

In a conventional system, data can be stored as a large number of individual files in a database or storage service such as, for example, Amazon S3, Microsoft Azure, and so forth. Depending upon the particular system implementation, queries of the data can be executed on one processing node or using a large number of processing nodes, also referred to herein as "epoch readers." In some embodiments, each epoch reader can query a subset of the data. When an actor (e.g., a user) issues a query, a system (e.g., a central coordinating node) can be configured to consult a metadata service to gather a list of files related to the user's query. Consulting the metadata service can include providing a time range being queried. The system can parcel out the files to one or more epoch readers, and each epoch reader can be given a list of files that it is responsible for querying. Each epoch reader can retrieve files from a storage service, scan the files for data matching the query, and return the results to a central coordinating node.

Typically, an epoch reader can be configured to maintain a local storage cache of recently queried files, recently generated files, or both. Maintaining a cache on an epoch reader can improve speeds, reduce costs, or both as caching obviates the need to retrieve files from the storage service. The local storage cache can be stored in a storage drive attached directly to the epoch reader. Alternatively, the local storage cache can be stored on another device, such as a file server, a network attached storage (NAS) device, and so forth. If a requested file is stored in the local storage cache, the epoch reader can retrieve the file from the local storage cache rather than retrieving the file from the storage service.

Conventional approaches to building a local storage cache have several drawbacks. For example, in a typical scenario, when an epoch reader needs to look at a particular file, the epoch reader checks to see whether the file is already in the local storage cache. If the file is not in the local storage cache, the epoch reader can download the file from the storage service and write it to the local storage cache. After the file is written to the local storage cache, the epoch reader determines that the file is in the local storage cache and the query is executed against the locally cached copy of the file.

In such an approach, after retrieving the file from the storage service, the epoch reader first writes the file to a storage device and then reads the file back from the storage device before initiating query processing logic. Writing to the storage device and reading from the storage device can present significant bottlenecks for processing queries. These bottlenecks can be especially severe if slower drives, such as traditional spinning hard disks, are used for storage. For example, the epoch reader may be delayed as it waits for the file to be written to disk or read from the storage device into memory (e.g., random access memory (RAM)).

In some conventional implementations, files must be written to the local storage cache before executing a query, even though a file may be rarely used or otherwise not worth adding to the local storage cache, which can waste storage space, cause delays while files are copied, and cause premature and unnecessary wear on the storage device.

Accordingly, it would be beneficial to have systems and methods that can enable faster querying and/or that can eliminate or avoid bottlenecks associated with writing data to the local cache.

FIG. 1 is a flowchart that illustrates an example process for executing a query according to some embodiments. At block 102, a system (e.g., a central coordinating node) can receive a query. At block 104, the system can consult a metadata service to gather a list of files that are relevant to the query. At block 106, the system can parcel out files to one or more epoch readers. Each epoch reader can be responsible for querying a subset of files. At block 108, the epoch readers can retrieve the files. For example, each epoch reader can retrieve the files that it is responsible for querying. An epoch reader may first consult a local cache to determine if a file is present. If so, the epoch reader can perform the query using the locally cached copy of the file. If the local cache does not contain the file, the epoch reader can download the file from a storage service. At block 110, the epoch readers can scan the files for data that matches the query. At block 112, each epoch reader can send the results of the query to the central coordinating node. At block 114, the central coordinating node can combine the results received from each epoch reader to assemble a final query result that can be provided to the requester.

Figure 2:
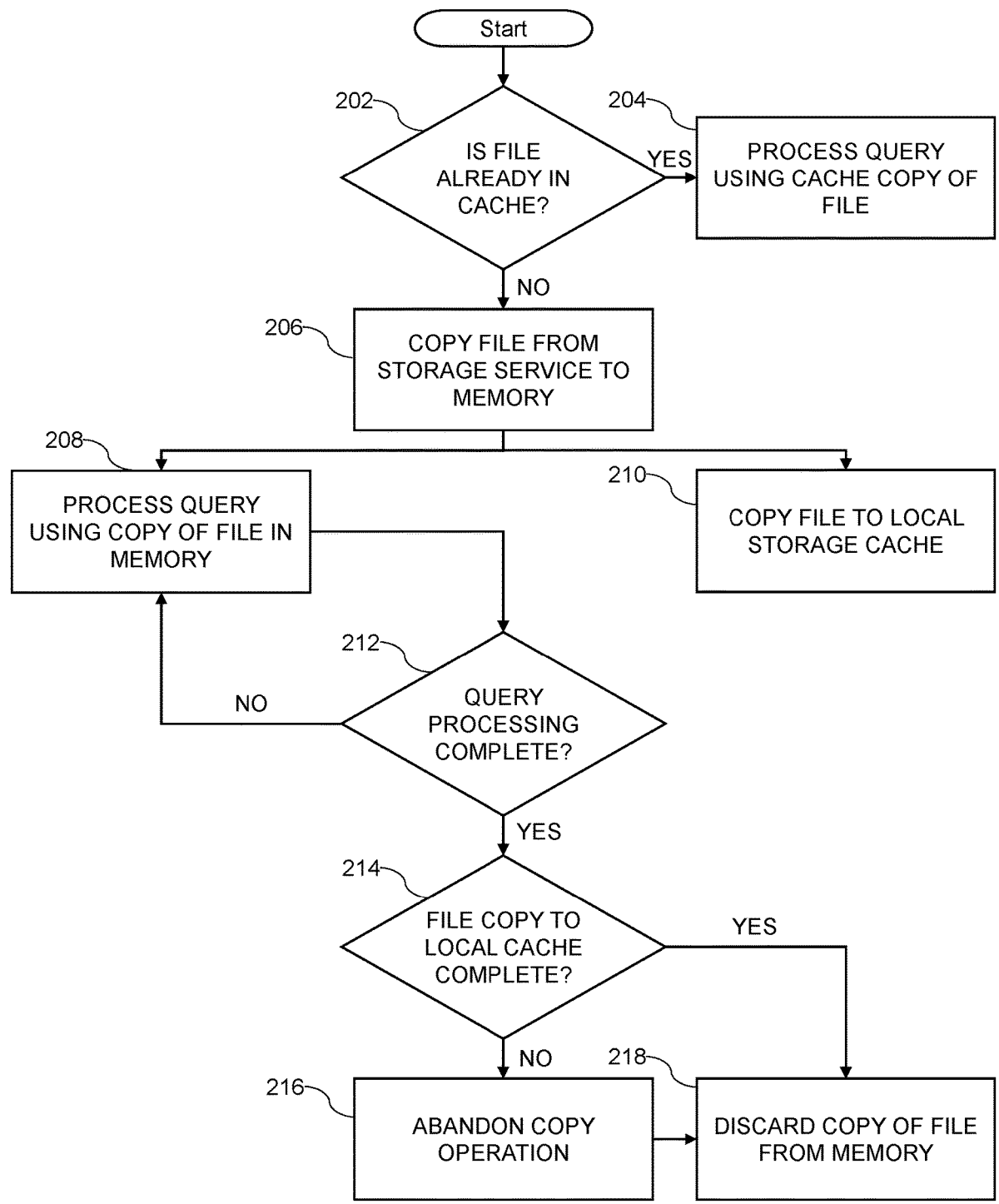
FIG. 2 is a flowchart that illustrates an example process for executing a query on an epoch reader according to some embodiments.

FIG. 2 shows an example process according to some embodiments for executing a query on an epoch reader. The process shown in FIG. 2 can be executed as part of a larger query process. For example, the process depicted in FIG. 2 can be executed at block 110 of FIG. 1. At decision point 202, the epoch reader can determine if a file is already in a cache. If the file is already present in the cache, then at block 204, the epoch reader can process the query using the cached copy of the file. If the file is not in the cache, then at block 206, the epoch reader can copy the file from a storage service to local memory (e.g., RAM). At block 208, the epoch reader can be configured to process the query using the copy of the file that is stored in memory (e.g., RAM). At block 210, a separate thread or process can be configured to copy the file from memory (e.g., RAM) to the cache (e.g., to local storage, a file server, a network attached storage device, etc.). The file copy operation at block 210 can execute while the query is being processed at block 208. At decision point 212, the epoch reader can determine if the query processing has been completed. If not, the epoch reader can continue to process the query at block 208. If the query processing is complete, the epoch reader can, at decision point 214, determine if the copy operation at block 210 is complete. If not, the epoch reader can, at block 216, abandon the copy operation. At block 218, the epoch reader can discard the copy of the file from memory (e.g., RAM). If, at decision point 214, the file copy operation is complete, the epoch reader can discard the copy of the file from memory (e.g., RAM).

The example process shown in FIG. 2 has several advantages. For example, queries can be performed more quickly as they can operate on in-memory copies of files, rather than first writing a file to cache and then reading it into memory. In some embodiments, the epoch reader can be configured with additional functionality. For example, the epoch reader may be able to determine that a file is infrequently used, exceeds a size limit, exceeds an age limit (e.g., older files may not be cached), and so forth. In such cases, the epoch reader may not write the file to the cache.

While the example process shown in FIG. 2 can offer several improvements over conventional approaches, sometimes files may not be written to the cache. For example, if the thread or process used to write the file to cache cannot maintain sufficient write speeds to prevent a system bottleneck, the file may not be written to cache. For example, if a system determines that it is time to discard a file from memory (e.g., RAM) but the file has not yet been written to the cache, the file may be discarded from memory anyway, in which case the file will not be written to the cache.

Preferential Caching of File Headers

In some cases, a data file can comprise a header and one or more segments. In some embodiments, a segment can contain a pre-determined amount of data. For example, a segment can include a pre-determined number of database records. In some embodiments, a segment can have a maximum file size. In some embodiments, the file can be compressed. In some embodiments, the segments can be compressed.

A header can include relatively small data structures that summarize the records within the file and/or within each segment. When a system executes a query on a file, for each segment in the file, the system can review a summary of the segment in the file header. In some embodiments, the system can be configured to utilize a space-efficient probabilistic data structure to generate the summary of the segment. In some embodiments, the system may determine if there is a possibility that the segment contains any records matching the query. If the system determines that there are no records matching the query, the system may omit the segment from further processing by the system, which can save significant processing time.

In a conventional implementation, the summary of the segments within a file allows the system to reduce processing time. For example, the number of segments to be decompressed (if the file and/or segments are compressed) and queried can be reduced greatly, for example by as much as 90%. However, in conventional approaches, the summaries do not reduce the time or cost of retrieving files from storage (e.g., from a storage service, local cache, etc.), as the files must be retrieved before their summaries can be analyzed.

According to some embodiments, separate files can be created for the header and segments. In some embodiments, each segment can be stored in its own file. In some embodiments, all the segments can be stored in the same file. In some embodiments, header files can be stored on a local disk of a system without necessarily storing all (or any) segments associated a particular header file. Accordingly, when querying a file, the system can use the summary data structures in the header file, which can be stored locally, to determine whether a file or segments within the file could match a query. If no segments match the query, the system can avoid accessing the corresponding file from a storage service. If some segments match the query, the system can download only the matching segments from the storage service, without downloading segments that do not match. In some embodiments, if all the segments are stored in the same file, the entire file can be downloaded from the storage service.

Figure 3:
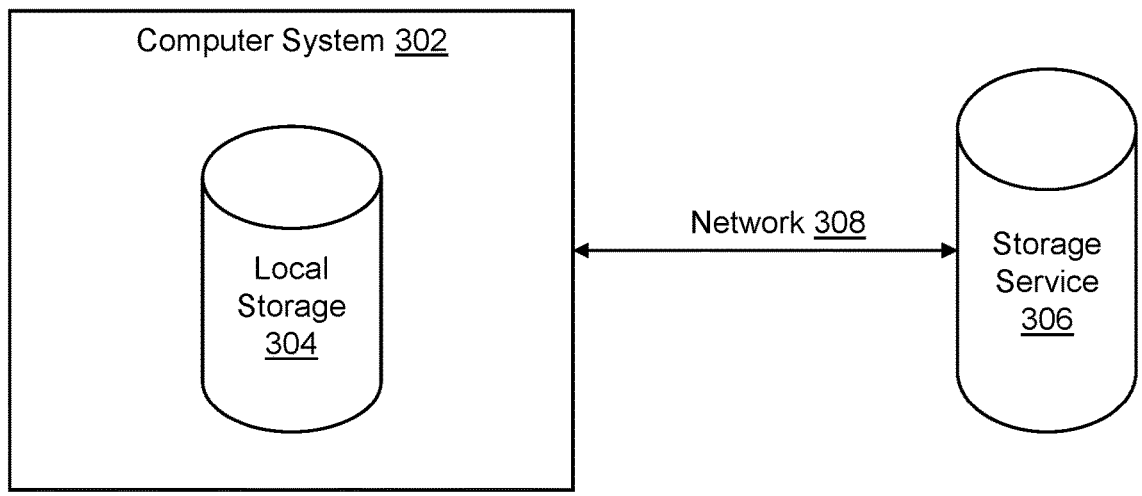
FIG. 3 illustrates an example system configuration according to some embodiments.

FIG. 3 illustrates an example system configuration according to some embodiments. A computer system 302 can include local storage 304. In some embodiments, the local storage 304 can store headers but may not store data segments. In some embodiments, the local storage can include locally cached copies of data, for example as described above. While FIG. 3 shows that the local storage 304 is part of the computer system 302, this is not necessary. For example, the local storage 304 can be a file server, network attached storage appliance, or other storage device that is accessible to the computer system 302. Data segments can be stored using a storage service 306, which can be accessed over network 308 (which can be, for example, the internet).

Figure 4:
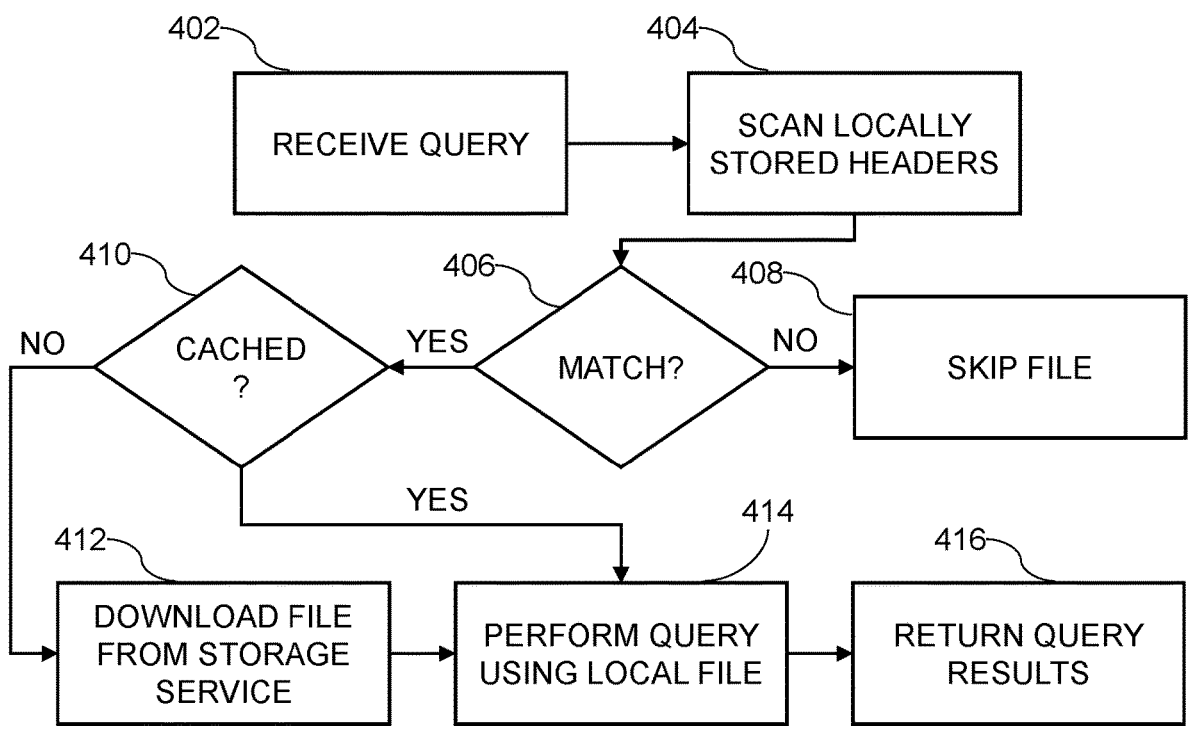
FIG. 4 is a flowchart that illustrates an example process for performing a query using locally stored headers according to some embodiments.

FIG. 4 is a flowchart that illustrates an example process for performing a query using locally stored headers according to some embodiments. At block 402, a system can receive a query. At block 404, the system can scan locally stored headers to determine which files or segments could include results that match that query. At decision point 406, if the headers indicate that a file or segment does not include matching results, the file or segment can be skipped at block 408. If the headers indicate that the file or segment may contain matches, at decision point 410, the system can determine if the file or segment is cached locally. In some embodiments, files or segments may, as a general matter, not be cached locally, and thus decision point 410 can be skipped and the process can proceed to block 412. If, at decision point 410, the system determines that the file is not cached, the system can download the file or segment from a storage service at block 412. The system can, at block 414, perform the query using the locally cached or downloaded file or segment. If, at decision point 410, the system determines that the file is already cached, the system can perform the query at block 414 using the cached copy of the file. At block 416, the system can return the query results. The process depicted in FIG. 4 can be performed as part of another process such as the process depicted in FIG. 1.

Query "No-Matches" Cache

In many use case scenarios, the same or similar queries are issued repetitively. For example, log analysis, extended detection and response (XDR) systems, and so forth often issue the same or similar queries multiple times, for example to determine if new instances of an event, error, etc., have occurred. For example, a user diagnosing a specific fault might search for "status='error_code_3005'." The user may later issue the same query again, for example to determine if the fault has occurred again since the last time the query was executed. In some cases, the user may want to refine a previously executed query, for example to limit to a particular region, time range, etc. For example, the user may issue a related query such as "status='error_code_3005' AND region='Europe'," indicating that the user wishes to restrict the previous results to a particular region (here, Europe).

Some conventional database systems employ a query cache to improve performance. That is, a database system can store the results of executing a query. If the same query is issued again within a defined (typically short) period of time or before the query is purged from the query cache, the system can re-use the previous results instead of running the query again. While this approach can reduce computational loads and increase the speed with which results can be delivered to the user, there are several drawbacks to such an approach. For example, cached results can quickly become stale and fail to reflect new data. In some cases, query results may be large, which can impose a nontrivial storage cost and can limit the amount of time for which a query can be cached, the number of queries that can be cached, and so forth. In some cases, it may not be possible to make use of a cached result for a broad query in order to optimize a more restricted query. For example, a database system may not be able to use the cached results for the query for "status='error_code_3005'" to optimize a query for "status='error_code_3005' AND region='Europe'."

In some embodiments, these drawbacks can be avoided or mitigated using alternative approaches to caching. Such approaches can take advantage of the fact that data is often stored in multiple files, many of which may not contain any matches for a given query. Additionally, in some embodiments, individual files may not be modified after being created (or once the file contains the maximum number of database records, reaches a maximum file size, etc.). Accordingly, when executing a query, if the query does not match with any records in a particular file and the file does not change over time, a system can record the lack of a match in a record (e.g., in a database, flat file, JSON file, etc.). For example, a "no-matches cache" can include a record of {query, file} pairs that indicates that a given file or segment does not contain matches for a given query. In some embodiments, before querying a file, the system can determine whether the {query, file} pair is already present in the no-matches cache. If the pair is present, the system may omit the file from further processing.

In some embodiments, the system can determine whether the no-matches cache contains an entry for the file and a broader query. If so, the system can omit the file from further processing. For example, if a user queries "A AND B" and the no-matches cache includes {A, fileX}, the system can omit the file (fileX) from processing, because if a file contains no matches for condition A, it cannot possibly contain matches for the more restrictive condition A and condition B. As another example, if the no-matches cache includes an entry for {A OR B, fileY}, then a query for condition A alone or a query for condition B alone could exclude fileY, as it is known that fileY contains matches for neither condition A nor condition B.

Accordingly, many drawbacks of traditional query caching can be avoided. The no-matches cache can be applied to individual files, which can be immutable, and thus the cache can avoid becoming stale. New data can be placed in new files, which can be picked up by subsequent queries. In some embodiments, actual query results may not be stored. Thus, storage usage can be minimized, enabling the system to cache a large number of queries. As discussed above, no-match cache results for a broad query can be used to reduce the number of files to be searched for a more restrictive query.

As mentioned above, data files are often divided into internal partitions or segments. Thus, in some embodiments, the no-matches cache can operate in a more fine-grained manner. In some embodiments, the cache can record which segments or partitions within a file contain matches for the query. Thus, even if a given file contains some matches, queries can skip certain segments of the file that are known not to include any matches.

Figure 5:
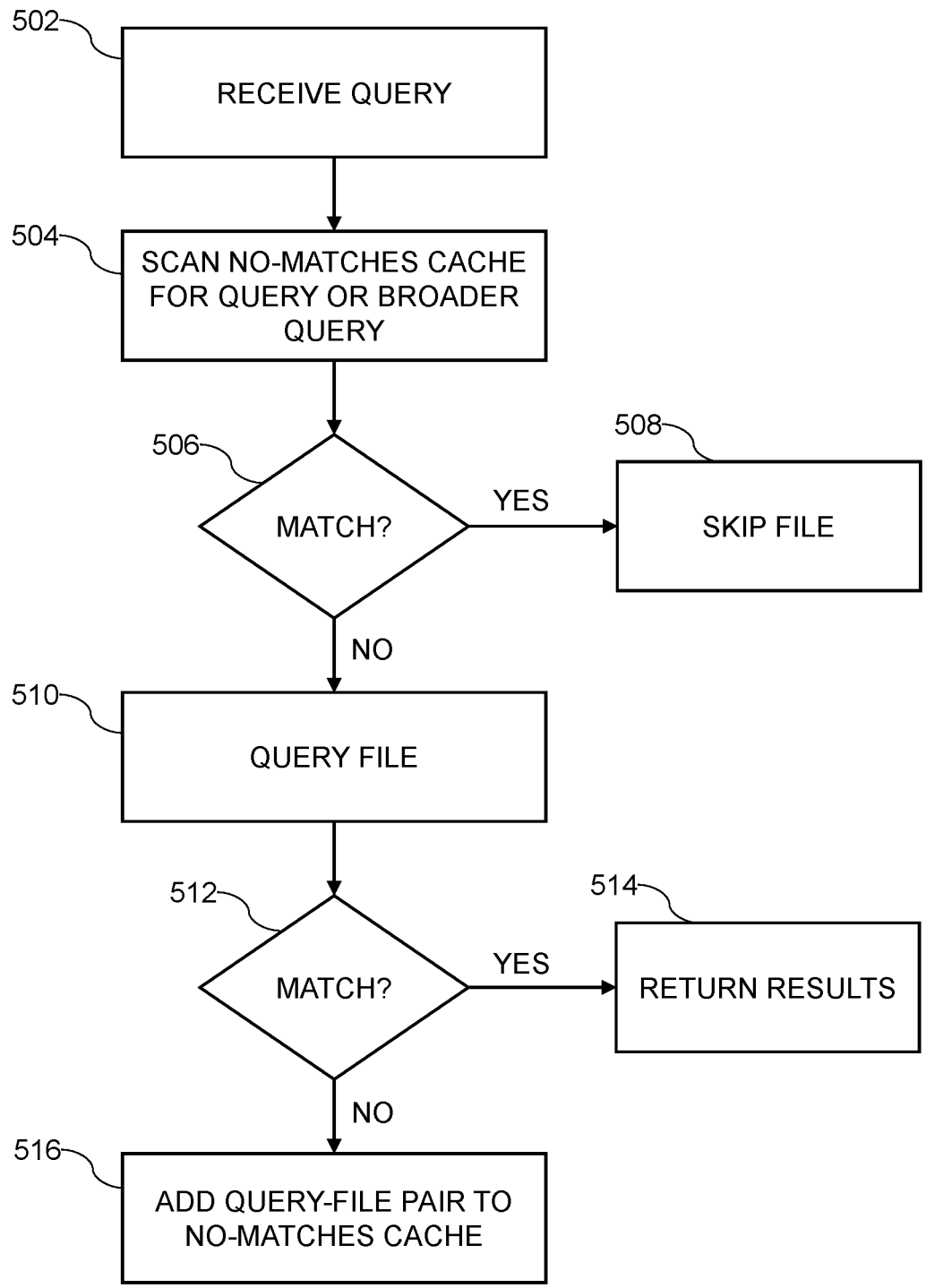
FIG. 5 is a flowchart that illustrates an example process for performing a query using a no-matches cache according to some embodiments.

FIG. 5 is a flowchart that illustrates an example process for performing a query using a no-matches cache according to some embodiments. At block 502, a system can receive a query. At block 504, the system can scan the no-matches cache to determine if the same query or a broader query is listed in the no-matches cache and, if so, which files (or, as mentioned above, segments or partitions) do not contain matches. At block 506, if the no-matches cache contains a match for the query or a broader query and a given file, the system can skip the file at block 508. If the no-matches cache does not contain a match for a given file, the system can query the file at block 510 to determine if the file contains matches. At decision point 512, if the file contains matches, the system can return results at block 514. If, at decision point 512, the file does not contain matches, the system can add the query-file pair (e.g., "{query, file}") to the no-matches cache, and the file can be skipped in subsequent searches.

Applying Columnar Data Optimization to Unstructured Data

Systems and methods currently exist for achieving high storage and query efficiency in columnar databases. These known techniques, however, rely on each column in the database having a rigid, well-defined structure. For example, a column may contain only Boolean values, only 16-bit integers, only variable-length strings, only floating-point numbers, and so forth.

However, data often may not be structured in such a rigid manner. For example, real-world log analytics and extended detection and response (XDR) datasets often include unstructured data that is not compatible with the restrictions of traditional columnar databases. For example, there may be no defined schema, or a schema may differ for different sources of data/Different records and/or data sources may store different, incompatible data types under a single field name. For example, one record from one source might have "status=404" while another record from another source may have "status='not_found'." Thus, for example, the "status" field for one record can be an integer while for another record the "status" field can be a string.

Accordingly, it would be beneficial to be able to store "unstructured" data (e.g., data in which a particular field can have multiple data types) within a columnar database. In some embodiments, a type code can be appended to a field name. For example, "status=404" could be rewritten as "status_int16=404," indicating that the type of field is a 16-bit integer. Similarly, "status='404'" could be rewritten as "status_string='404'," indicating that the type of field is a string. As used herein, the base field name (e.g., "status") can be referred to as the logical field name, and the base field name combined with the type code (e.g., "status_int16") can be referred to as the physical field name. Such an approach can be used for any number of fields that may have different data types. For example, different logs may have different formats for error codes, status codes, exit codes, dates, times, usernames, computer names, network addresses, etc.

The resulting dataset can comprise well-typed columns. However, each column may be sparsely populated (e.g., defined for only a subset of records). Methods known to those of skill in the art can be used to efficiently store and work with sparse columns in a columnar data store.

While the examples above and below show that the type code can be appended at the end of the logical field name separated by an underscore, other implementations are possible. For example, the type code could instead be appended at the beginning of the physical field name (e.g., "int16_string"). Other separator characters could be used, or no separator characters can be used. For example, the type code can have a fixed length, enabling it to be identified and distinguished from the logical field name easily. Any combination of type code and logical field name can be used, although preferably it is simple to programmatically identify the type code and logical field name.

In some embodiments, a set of columns can be determined manually. For example, an individual can inspect data sources (e.g., log files, database tables, and so forth) and determine the possible data types for a given field. The individual can create a database schema that identifies the fields in the data sources and their possible data types. For example, an individual can manually specify that a columnar database table should have columns for "status" having integer and string data types, which can have physical field names of, for example, "status_int" and "status_string."

In some embodiments, a computer system can be configured to automatically detect the names and types of fields by examining the data sources. For example, the system can determine the data types of fields in a database table by inspecting the defined field types and names included in a database table. In some embodiments, the system can examine text-based files to determine fields and/or data types. In some embodiments, the file can include a row that identifies the name of each field in the file. In some embodiments, the file can include a row that identifies the data type of each field. In some embodiments, the file may not include identification of the data type of each field. In some embodiments, the system can be configured to examine the data in the file to determine the name and/or data type of each field. In some embodiments, the system can, for example, examine the first row or a number of rows in the file to determine the names and/or data types of the fields. For example, the system can inspect the first row, the first five rows, the first ten rows, a random selection of rows, or any other number of rows which can be selected sequentially, randomly, according to a defined pattern (e.g., every tenth row), or any other inspection scheme that enables accurate determination of the data types for each field. In some embodiments, the file can include one or more delimiters (e.g., commas, spaces, tabs, vertical bars, slashes, semicolons, and so forth) that separate the fields. In some embodiments, a data type can be determined incorrectly. For example, inspection of the file can cause the system to identify the field as numeric when it should be identified as a string. Thus, in some embodiments, the system can be configured to present the identified fields and data types to a user. In some embodiments, the user can manually override one or more field types identified by the system.

In some embodiments, the source data can be organized into rows and columns and the analysis can proceed as described above. In some embodiments, the source data can be organized in another manner. For example, the source data can be formatted using JavaScript Object Notation (JSON). The system can be configured to parse such files, for example by examining one or more records to determine the names of attributes (e.g., fields) and their data types, for example by examining values associated with attributes. Similar approaches can be applied to other data formats, such as YAML and XML.

In some embodiments, the system can be configured to create a table that includes columns for each identified field. In some embodiments, the system may determine that a field can have more than one data type. In some embodiments, the system can create a different column for each possible data type for a given field. For example, if the system determines (or a user specifies) that a field can be of type "VARCHAR" (e.g., a string of variable length) or an integer, the system can create fields with physical field names that identify the logical field name and the data type of the field. In some embodiments, the system can be configured to create physical field names that include the logical field name and data type for all fields. In some embodiments, the system can be configured such that physical field names that include the data type are only created for fields that can have more than one data type. For example, if a "status" field can be either a string or numeric, the system can create fields "status_string" and "status_int16." If a field, for example a "description" field, can have only a single data type (e.g., string), the system can create a physical field named "description" without including the data type in the field name, although in some embodiments the physical field name can include the data type (e.g., "description string"). Including the field name regardless of whether the logical field can have more than one type may simplify data loading and querying processes, as it may not be necessary to determine which logical fields have multiple types and which have only a single type when determining how to store or query data.

In some embodiments, a similar field can be named differently in different data sources. For example, one data source may have a field name "timestamp" while another may name a similar field "time." Similarly, a status code may alternatively be referred to as an error code, return code, and so forth. Thus, in some embodiments, the system can be configured such that fields having different names but similar content in different sources of data have the same logical name in the created table. In some embodiments, values can be translated or converted, as described in more detail below. In some embodiments, data that is stored in a single field in one file or other data structure (e.g., a database table) can be stored in multiple fields in another file or data structure. For example, timestamps in one file or data structure can be stored as a date field and a time field, while in another file or data structure, the date and time can be stored in a single field. In some embodiments, a combined field (e.g., a field containing both date and time) can be split into two fields. In some embodiments, two or more individual fields can be combined into a single field (e.g., date and time can be combined into a single field). In some embodiments, fields may not be split or combined, thereby preserving the original structure of the data sources.

As discussed in more detail below, data loading procedures and data querying procedures can be configured to account for differences in naming conventions in different data sources. In some embodiments, rules for mapping fields can be generated at the time that the table is created. In some embodiments, such rules may be generated after the table is created and/or can be modified after the table is created. In some embodiments, there can be rules for combining fields, splitting fields, renaming fields, dropping fields, reformatting fields, and so forth. In some embodiments, values can be changed. For example, a field for "error" can be Boolean (e.g., "TRUE" or "FALSE") or numeric (e.g., a return code or exit status of 0 or 1, etc.). In some embodiments, a value can be translated from Boolean to numeric, and/or vice versa. A field for "success" could be translated into an error field. For example, a value of "TRUE" for the "success" field could be translated into a value of "FALSE" and stored as an "error" value. An exit code of 0 (which typically indicates success) could be translated to a Boolean value of "TRUE" for a "success" field or a value of "FALSE" for an "error" field. Such transformations can simplify querying procedures as the author of the query may not need to keep track of multiple logical field names that all contain similar information. In some embodiments, however, fields may not be renamed and/or values may not be altered, for example if a user needs or wishes to preserve the original naming and/or formatting.

In some embodiments, rules to apply can be determined by inspecting a data source (e.g., by examining metadata of a source table to determine field names and types or by inspecting a log file to determine field names and types). In some embodiments, rules can be associated with data sources stored in a particular database table, in a particular directory, and so forth. For example, program XYZ may be configured to store logs in a particular directory (e.g., "/var/logs/XYZ/"). Thus, the system can be configured to apply particular rules to any logs found in the particular database table or directory.

While the use of predefined rules can be useful, in some embodiments, a system may not store any defined rules. For example, a system can be configured to determine the field names and data types of a log and to store data in fields named accordingly without the use of rules. Such an approach can be simpler to implement but may not offer all of the features described herein, such as dropping fields, combining fields, splitting fields, altering values, or renaming fields.

FIG. 6 is a flowchart illustrating an example process for creating a table for storing combined data which can be run on a computing system according to some embodiments. At block 602, the system can determine field names and data types for one or more sources of data. At block 604, the system can determine corresponding fields in different sources of data. For example, the system can determine that two or more data sources contain fields that store the same or similar information and/or that two or more data sources contain fields with the same names. At block 606, the system can generate a schema for the combined table. At block 608, the system can optionally generate one or more rules, a mapping table, or other otherwise store information indicating how source data should be mapped to the combined table. The rules, mapping table, etc., can additionally or alternatively store information indicating how fields should be transformed or renamed, which fields should be dropped, which fields should be split into multiple fields or combined into a single field, and so forth.

In some embodiments, a system can be configured to add data sources to an existing table. For example, a new monitoring system can be added or can replace an existing system, or an existing system may be updated such that a data format changes. In some embodiments, the system can be configured to update the combined table accordingly.

FIG. 7 is a flowchart that illustrates an example process for updating an existing combined table according to some embodiments. At block 702, the system can determine the fields (e.g., field names and data types) in a new or modified data source. At block 704, the system can determine the correspondence of the fields in the new or modified data source to the fields in the existing combined table. At block 706, the system can update the combined table to account for the new or modified data source, for example by modifying the combined table directly or generating a script (e.g., an SQL script or Python script) for modifying the combined table. For example, if the new or modified source contains a field that did not previously exist in the combined data, the system can add the new field. If the new or modified source has a field of a different type, the system can add the additional data type by creating a new column. For example, if the existing combined table had a field for storing "status" as a string and the new or modified source stores status as an integer, the system can add a column for the new data type (e.g., "status_int16"). In some embodiments, the system can be configured to update the name of an existing field in the combined table. Continuing with the previous example, if the field that stored status as a string were previously named "status," the system can rename the field to "status_string." At block 708, the system can update the mapping rules or table to account for the modifications to the combined table.

In some embodiments, a service can be configured to monitor one or more data sources and to load new data into the combined table. In some embodiments, the service can monitor continuously for new data. In some embodiments, the service can monitor for new data on a periodic basis, such as hourly, daily, weekly, monthly, or any other schedule as may be desirable. In some embodiments, a user can manually trigger the loading of data into the combined table.

Figure 8:
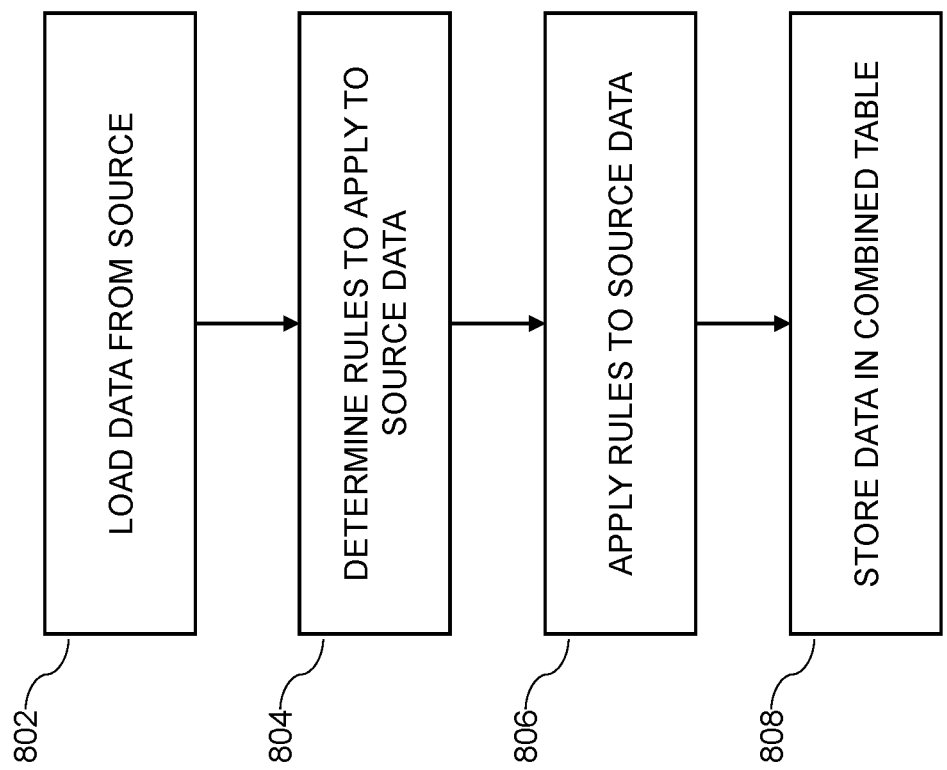
FIG. 8 is a flowchart that illustrates an example process for loading data into a combined table according to some embodiments.

FIG. 8 is a flowchart that illustrates an example process for loading data into a combined table according to some embodiments. In the process illustrated in FIG. 8, rules are used when loading data into the combined table. At block 802, a system can be configured to load data from a source which can be, for example, a file, database table, web page, etc. At block 804, the system can determine one or more rules to apply to the source data. For example, the system can determine which rules to apply by inspecting the metadata of a database, by inspecting a text file, and/or by identifying a source of the data (e.g., directory, database name, table name, uniform resource locator, and so forth). The rules can indicate how fields should be named or renamed, which fields should be combined or split, which fields should not be included in the combined table, how values should be transformed, and so forth. At block 806, the system can apply the rules to the source data and, at block 808, the data can be stored in the combined table.

Figure 9:
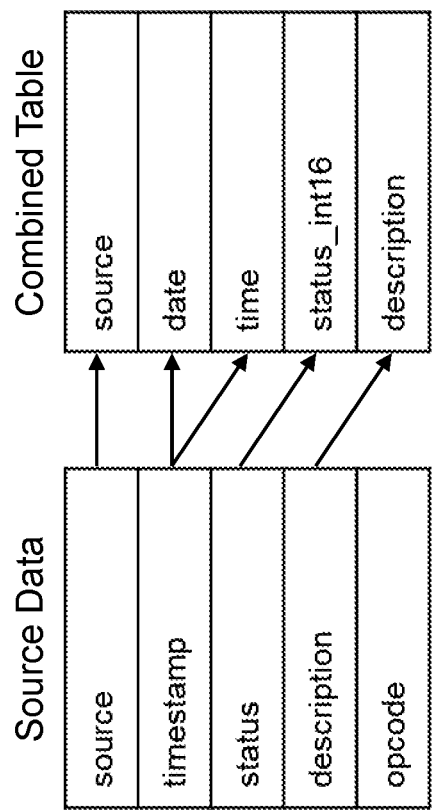
FIG. 9 illustrates an example of loading data from a source into a combined table according to the process illustrated in FIG. 8.

FIG. 9 illustrates an example of loading date from a source into a combined table according to the process illustrated in FIG. 8. In the example of FIG. 9, the "source" field has the same name in both the source data and the combined table. The "timestamp" field in the source data can be split into a "date" field and a "time" field in the combined table. The data in the "status" field can be of integer type and can be stored in a "status_int16" field in the combined table. There can be, for example, another status field used by for storing data from other sources that is in string format which can be called, for example, "status_string." The "description" field can have the same name and type in both the source data and the combined table. The source data can include a field (e.g., "opcode") that is not loaded into the combined table. As discussed above, in some embodiments, each field in the combined table can have a physical field name that includes a data type. For example, the combined table in FIG. 9 could alternatively include fields with names such as "status_string" instead of "status," "date_date" instead of "date," "time_time" instead of "time," and "description string" instead of "description."

Figure 10:
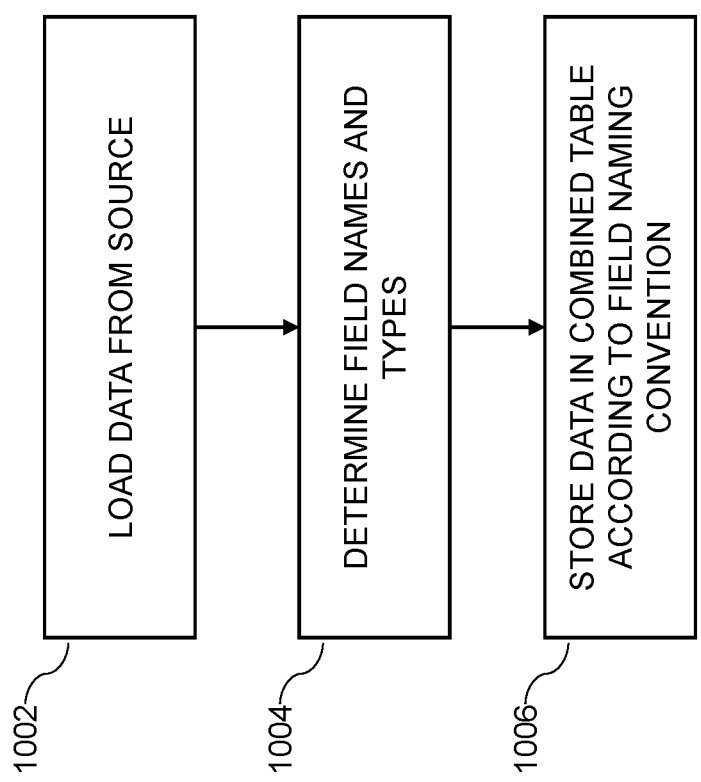
FIG. 10 is a flowchart that illustrates an example process for loading data into a combined data according to some embodiments.

FIG. 10 is a flowchart that illustrates an example process for loading data into a combined data according to some embodiments. In the process illustrated in FIG. 10, rules may not be used when loading data into the combined data table. At block 1002, a system can load data from a source. At block 1004, the system can determine the field names and data types for the data, for example by examining a log file as described above or by examining metadata of a database table as described above. At block 1006, the system can store the data in the combined table according to a field naming convention. The field naming convention can be, for example, stored in a configuration file or database table. In some embodiments, the system may determine which fields of the combined table include data types in the field names and which do not, for example by executing a query on the combined table to determine the field names. As discussed above, the names of the physical fields of the combined table could alternatively each include a data type, which can simplify mapping the fields of the source data to the fields of the combined table as there is no need to determine which fields in the combined table include a data type in the name and which do not.

Figure 11:
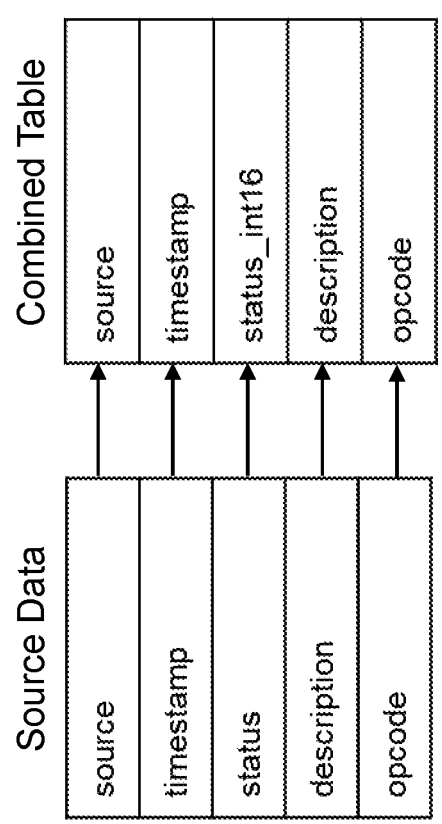
FIG. 11 illustrates an example of loading data from a source into a combined table according to the process illustrated in FIG. 10.

FIG. 11 illustrates an example of loading data from a source into a combined table according to the process illustrated in FIG. 10. In the example of FIG. 11, the source, timestamp, description, and opcode fields are copied into corresponding fields in the combined table. The "status" field in the source data is copied into the "status_int16" field in the combined table, for example because there may be a "status_string" field in the combined table for storing string-formatted "status" indications.

While the example methods discussed above enable loading unstructured or differently structured data into a columnar database, such an approach presents significant usability challenges. For example, a user who wishes to query for "status=404" would need to be aware that the combined table has renamed the field to status_int16. The user may need to specify multiple physical fields for the same logical field. Thus, constructing queries can become a burdensome and error-prone process. Accordingly, it can be beneficial to have a system or module that can accept queries that are written in a simpler format (e.g., specifying logical field names instead of physical field names) and apply appropriate transformations to the query to create a translated query for execution against the combined table.

A query processing module can be used to transform a received query into a query for execution against the combined data table. The query processing module can, for example, map logical field names to physical field names, for example by applying mapping rules which can be created as described above. In some embodiments, the query processing module can alter the names of fields and/or the target values. For example, the query processing module can be configured to translate "error=TRUE" to "success=FALSE." In some embodiments, a database table, text file, or other data structure can include a mapping of logical field names to physical field names. In some embodiments, instead of maintaining a database table or other data structure, a system can be configured to query a database table to determine which columns are present in the table. The mapping can be determined by, for example, identifying all columns whose names begin with the logical field name and which are followed by a type code (and, optionally, one or more separator characters between the logical field name and the type code). The query processing module can optionally apply one or more additional rules to the received query to generate a translated query.

In some embodiments, the query processing module can be configured so that a received query is not translated prior to execution, although such functionality is not necessary and may not be present in all implementations. For example, a user can include a flag in a query that indicates the query should be executed as-is, without applying mapping or other rules or transformations. This can be desirable if, for example, the exact query to be executed is already known to the user (for example, as a result of a previous translation). Skipping translation of the query can speed up query processing times as there is no need to determine how to rewrite the query prior to execution.

As one example of translating a query, a search for "status=404" can be rewritten as "status_int16=404 OR status_string=404." In many cases, it is impossible for certain physical columns to match the specified criteria, and these columns can be eliminated from the query. For example, status_string can only contain string values, and thus can never contain the integer value 404. Thus, the above query can be rewritten as simply "status_int16=404."

In some embodiments, it may be desirable to query all the physical fields that correspond to a particular logical field name. In some embodiments, a system can be configured to attempt to translate from one data type to another. For example, the system can be configured to translate the number 404 to the string "404." Accordingly, in some embodiments, the above query can be rewritten as "status_int16=404 OR status_string='404'." In many use cases, this may not be desirable as it can result in unnecessarily complex queries that execute more slowly. However, such an approach may be desirable if, for example, there is a concern that a data type for a field was configured incorrectly.

Figure 12:
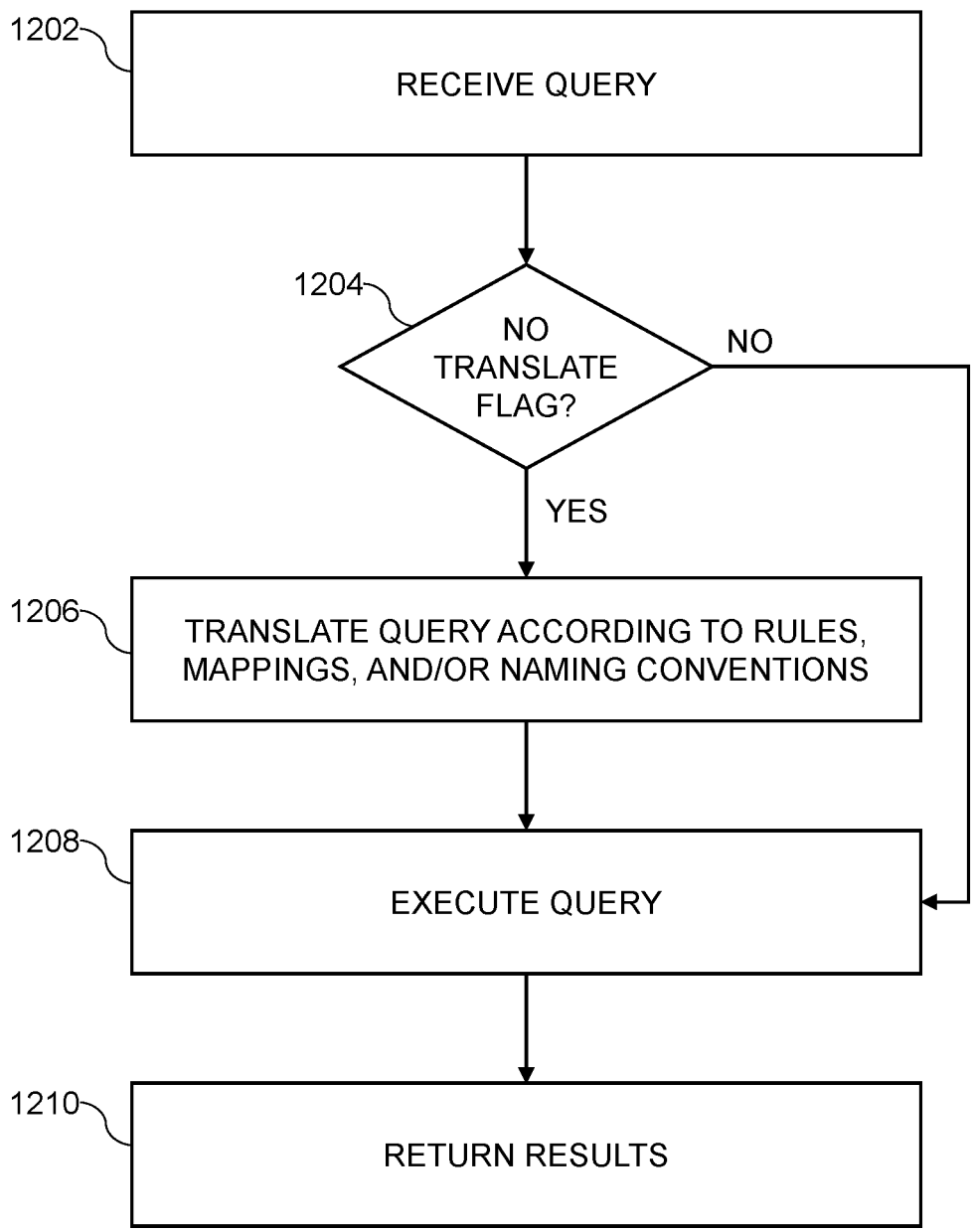
FIG. 12 is a flowchart that illustrates an example process for executing a query according to some embodiments.

FIG. 12 is a flowchart that illustrates an example process for executing a query according to some embodiments. At block 1202, a system can be configured to receive a query. At decision point 1204, the system can determine if a flag is set indicating that the query should not be translated but should instead be processed as submitted. If, at decision point 1204, the query should not be translated, the system can execute the query at block 1208 and return the results of the query at block 1210. If, at decision point 1204, the query should be translated, at block 1206, the system can translate the query according to one or more rules, mappings, and/or naming conventions, as described in more detail above. At block 1208, the system can execute the translated query and, at block 1210, the system can return the results of the translated query. In some embodiments, the system can return the translated query itself, for example to enable subsequent execution of the same query without translation.

Computer Systems

Figure 13:
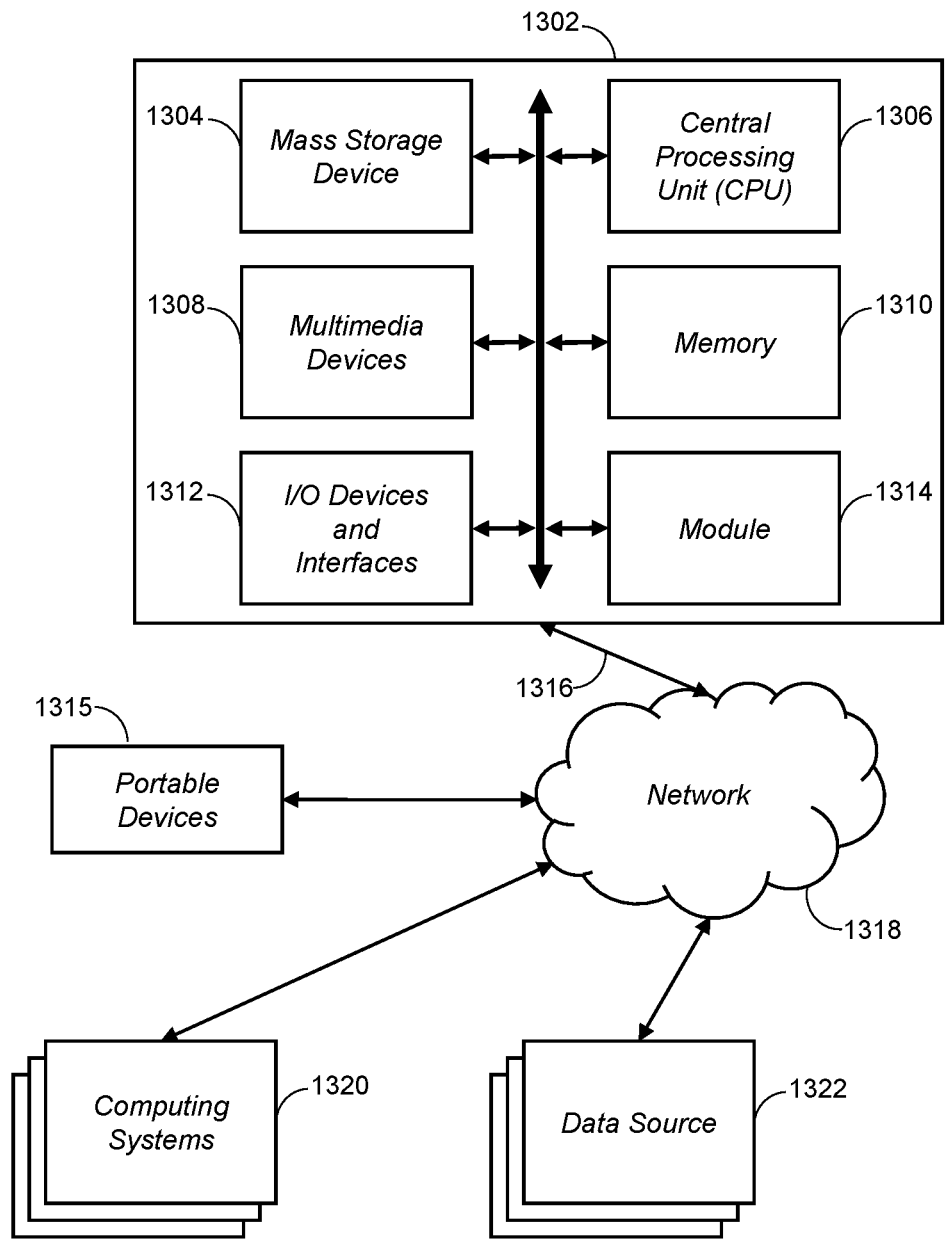
FIG. 13 is a diagram that illustrates an example computer system that can be configured to execute one or more of the embodiments disclosed herein.

FIG. 13 is a block diagram depicting an embodiment of a computer hardware system configured to run software for implementing one or more embodiments disclosed herein.

In some embodiments, the systems, processes, and methods described herein are implemented using a computing system, such as the one illustrated in FIG. 13. The example computer system 1302 is in communication with one or more computing systems 1320 and/or one or more data sources 1322 via one or more networks 1318. While FIG. 13 illustrates an embodiment of a computing system 1302, it is recognized that the functionality provided for in the components and modules of computer system 1302 may be combined into fewer components and modules, or further separated into additional components and modules.

The computer system 1302 can comprise a data management and query module 1314 that carries out the functions, methods, acts, and/or processes described herein. The data management and query module 1314 is executed on the computer system 1302 by a central processing unit 1306 discussed further below.

In general, the word "module," as used herein, refers to logic embodied in hardware or firmware or to a collection of software instructions, having entry and exit points. Modules are written in a program language, such as JAVA, C or C++, Python, or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems and may be stored on or within any suitable computer readable medium or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 1302 includes one or more processing units (CPU) 1306, which may comprise a microprocessor. The computer system 1302 further includes a physical memory 1310, such as random-access memory (RAM) for temporary storage of information, a read only memory (ROM) for permanent storage of information, and a mass storage device 1304, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 1302 are connected to the computer using a standards-based bus system. The bus system can be implemented using various protocols, such as Peripheral Component Interconnect (PCI), Micro Channel, SCSI, Industrial Standard Architecture (ISA) and Extended ISA (EISA) architectures.

The computer system 1302 includes one or more input/output (I/O) devices and interfaces 1312, such as a keyboard, mouse, touch pad, and printer. The I/O devices and interfaces 1312 can include one or more display devices, such as a monitor, which allows the visual presentation of data to a user. More particularly, a display device provides for the presentation of GUIs as application software data, and multi-media presentations, for example. The I/O devices and interfaces 1312 can also provide a communications interface to various external devices. The computer system 1302 may comprise one or more multi-media devices 1308, such as speakers, video cards, graphics accelerators, and microphones, for example.

The computer system 1302 may run on a variety of computing devices, such as a server, a Windows server, a Structure Query Language server, a Unix Server, a personal computer, a laptop computer, and so forth. In other embodiments, the computer system 1302 may run on a cluster computer system, a mainframe computer system and/or other computing system suitable for controlling and/or communicating with large databases, performing high volume transaction processing, and generating reports from large databases. The computing system 1302 is generally controlled and coordinated by an operating system software, such as Windows XP, Windows Vista, Windows 7, Windows 8, Windows 130, Windows 131, Windows Server, Unix, Linux (and its variants such as Debian, Linux Mint, Fedora, and Red Hat), SunOS, Solaris, Blackberry OS, z/OS, iOS, macOS, or other operating systems, including proprietary operating systems. Operating systems control and schedule computer processes for execution, perform memory management, provide file system, networking, and I/O services, and provide a user interface, such as a graphical user interface (GUI), among other things.

The computer system 1302 illustrated in FIG. 13 is coupled to a network 1318, such as a LAN, WAN, or the Internet via a communication link 1316 (wired, wireless, or a combination thereof). Network 1318 communicates with various computing devices and/or other electronic devices. Network 1318 is communicating with one or more computing systems 1320 and one or more data sources 1322. The data management and query module 1314 may access or may be accessed by computing systems 1320 and/or data sources 1322 through a web-enabled user access point. Connections may be a direct physical connection, a virtual connection, and other connection type. The web-enabled user access point may comprise a browser module that uses text, graphics, audio, video, and other media to present data and to allow interaction with data via the network 1318.

Access to the data management and query module 1314 of the computer system 1302 by computing systems 1320 and/or by data sources 1322 may be through a web-enabled user access point such as the computing systems' 1320 or data source's 1322 personal computer, cellular phone, smartphone, laptop, tablet computer, e-reader device, audio player, or another device capable of connecting to the network 1318. Such a device may have a browser module that is implemented as a module that uses text, graphics, audio, video, and other media to present data and to allow interaction with data via the network 1318.

The output module may be implemented as a combination of an all-points addressable display such as a cathode ray tube (CRT), a liquid crystal display (LCD), a plasma display, or other types and/or combinations of displays. The output module may be implemented to communicate with input devices 1312 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition, a touch screen may act as a hybrid input/output device. In another embodiment, a user may interact with the system more directly such as through a system terminal connected to the score generator without communications over the Internet, a WAN, or LAN, or similar network.

In some embodiments, the system 1302 may comprise a physical or logical connection established between a remote microprocessor and a mainframe host computer for the express purpose of uploading, downloading, or viewing interactive data and databases online in real time. The remote microprocessor may be operated by an entity operating the computer system 1302, including the client server systems or the main server system, an/or may be operated by one or more of the data sources 1322 and/or one or more of the computing systems 1320. In some embodiments, terminal emulation software may be used on the microprocessor for participating in the micro-mainframe link.

In some embodiments, computing systems 1320 who are internal to an entity operating the computer system 1302 may access the data management and query module 1314 internally as an application or process run by the CPU 1306.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

The computing system 1302 may include one or more internal and/or external data sources (for example, data sources 1322). In some embodiments, one or more of the data repositories and the data sources described above may be implemented using a relational database, such as Sybase, Oracle, CodeBase, DB2, PostgreSQL, and Microsoft® SQL Server as well as other types of databases such as, for example, a NoSQL database (for example, Couchbase, Cassandra, or MongoDB), a flat file database, an entity-relationship database, an object-oriented database (for example, InterSystems Caché), a cloud-based database (for example, Amazon RDS, Azure SQL, Microsoft Cosmos DB, Azure Database for MySQL, Azure Database for MariaDB, Azure Cache for Redis, Azure Managed Instance for Apache Cassandra, Google Bare Metal Solution for Oracle on Google Cloud, Google Cloud SQL, Google Cloud Spanner, Google Cloud Big Table, Google Firestore, Google Firebase Realtime Database, Google Memorystore, Google MongoDB Atlas, Amazon Aurora, Amazon DynamoDB, Amazon Redshift, Amazon ElastiCache, Amazon MemoryDB for Redis, Amazon DocumentDB, Amazon Keyspaces, Amazon Neptune, Amazon Timestream, or The computer system 1302 may also access one or more databases 1322. The databases 1322 may be stored in a database or data repository. The computer system 1302 may access the one or more databases 1322 through a network 1318 or may directly access the database or data repository through I/O devices and interfaces 1312. The data repository storing the one or more databases 1322 may reside within the computer system 1302.

Additional Embodiments

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Any methods disclosed herein need not be performed in the order recited. Thus, it is intended that the scope of the invention herein disclosed should not be limited by the particular embodiments described above.

It will be appreciated that the systems and methods of the disclosure each have several innovative aspects, no single one of which is solely responsible or required for the desirable attributes disclosed herein. The various features and processes described above may be used independently of one another or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will also be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Further, while the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present. The headings provided herein, if any, are for convenience only and do not necessarily affect the scope or meaning of the devices and methods disclosed herein.

Accordingly, the claims are not intended to be limited to the embodiments shown herein but are to be accorded the widest scope consistent with this disclosure, the principles and the novel features disclosed herein.

What is claimed is:

1. A computer-implemented method for optimizing query processing in a cloud database storage system using a best-effort cache population, the computer-implemented method comprising:
   receiving, by a central coordinating node from a query source, a query of a dataset stored in the cloud database storage system, wherein the query comprises at least one query parameter, wherein the at least one query parameter comprises a time range;
   transmitting, by the central coordinating node to a metadata service, one or more query parameters of the at least one query parameter, wherein the one or more transmitted query parameters comprises the time range;
   receiving, by the central coordinating node from the metadata service, a list comprising a plurality of files related to the query, wherein each file of the plurality of files related to the query is selected from the time range;
   distributing, by the central coordinating node to a plurality of processing nodes, the plurality of files related to the query, wherein each processing node of the plurality of processing nodes is assigned a corresponding subset of the plurality of files, and wherein each processing node of the plurality of processing nodes comprises a local storage cache of recently queried files and/or recently generated files of the cloud database storage system;
   determining, by each of the plurality of processing nodes, whether the corresponding subset of the plurality of files is stored on the local storage cache;
   if the corresponding subset of the plurality of files is not stored on the local storage cache:

retrieving, by each of the plurality of processing nodes, the corresponding subset of the plurality of files not stored on the local storage cache from the cloud database storage system;

storing, by each of the plurality of processing nodes, the retrieved corresponding subset of the plurality of files in a local random access memory corresponding to each of the plurality of processing nodes;

scanning, by each of the plurality of processing nodes, the corresponding subset of the plurality of files stored in the local random access memory for data matching the at least one query parameter to generate a subset of query results;

copying, concurrently with the scanning and using a separate processing thread from the scanning, the corresponding subset of the plurality of files stored in the local random access memory to the local storage cache;

determining that the scanning is complete;

determining if the copying is complete; and if the copying is not complete:
  abandoning the copying; and
  discarding the subset of the plurality of files from the local random access memory;

if the corresponding subset of the plurality of files is stored on the local storage cache:
  scanning, by each of the plurality of processing nodes, the corresponding subset of the plurality of files stored on the local storage cache for data matching the at least one query parameter to generate the subset of query results;

transmitting, from each of the plurality of processing nodes to the central coordinating node, the subset of query results;

aggregating, by the central coordinating node, each subset of query results from each of the plurality of processing nodes to generate a final query result; and transmitting, by the central coordinating node to the query source, the final query result, wherein the central coordinating node and each of the plurality of processing nodes comprise a processor and computer-readable memory.

2. The method of claim 1, wherein the local storage cache is stored in a local storage drive in communication with a corresponding node.

3. The method of claim 2, wherein the local storage drive comprises an SSD device.

4. The method of claim 1, wherein the local storage cache is stored on a file server or a network attached storage (NAS) device.

5. The method of claim 1, wherein the cloud database storage system comprises Amazon Simple Storage Service (S3).

6. The method of claim 1, wherein the plurality of processing nodes comprise epoch readers.

7. A computer system for optimizing query processing in a cloud database storage system using a best-effort cache population, the system comprising:
  a central coordinating processing node and a plurality of processing nodes;
  one or more non-transitory computer storage media in communication with the central coordinating processing node and/or the plurality of processing nodes and configured to store computer-executable instructions that when executed by the central coordinating processing node and/or the plurality of processing nodes, cause the central coordinating processing node and/or the plurality of processing nodes to:
    receive, by the central coordinating processing node from a query source, a query of a dataset stored in the cloud database storage system, wherein the query comprises at least one query parameter, wherein the at least one query parameter comprises a time range;
    transmit, by the central coordinating processing node to a metadata service, one or more query parameters of the at least one query parameter, wherein the one or more transmitted query parameters comprises the time range;
    receive, by the central coordinating processing node from the metadata service, a list comprising a plurality of files related to the query, wherein each file of the plurality of files related to the query is selected from the time range;
    distribute, by the central coordinating processing node to the plurality of processing nodes, the plurality of files related to the query, wherein each processing node of the plurality of processing nodes is assigned a corresponding subset of the plurality of files, and wherein each processing node of the plurality of processing nodes comprises a local storage cache of recently queried files and/or recently generated files of the cloud database storage system;
    determine, by each of the plurality of processing nodes, whether the corresponding subset of the plurality of files is stored on the local storage cache;
    if the corresponding subset of the plurality of files is not stored on the local storage cache:
      retrieve, by each of the plurality of processing nodes, the corresponding subset of the plurality of files not stored on the local storage cache from the cloud database storage system;
      store, by each of the plurality of processing nodes, the retrieved corresponding subset of the plurality of files in a local random access memory corresponding to each of the plurality of processing nodes;
      scan, by each of the plurality of processing nodes, the corresponding subset of the plurality of files stored in the local random access memory for data matching the at least one query parameter to generate a subset of query results; and
      copy, concurrently with the scanning and using a separate processing thread from the scanning, the corresponding subset of the plurality of files stored in the local random access memory to the local storage cache;
    determine that the scanning is complete;
    determine if the copying is complete; and
    if the copying is not complete:
      abandon the copying; and
      discard the subset of the plurality of files from the local random access memory;
    if the corresponding subset of the plurality of files is stored on the local storage cache:
      scan, by each of the plurality of processing nodes, the corresponding subset of the plurality of files stored on the local storage cache for data matching the at least one query parameter to generate the subset of query results;
    transmit, from each of the plurality of processing nodes to the central coordinating processing node, the subset of query results;

aggregate, by the central coordinating processing node, each subset of query results from each of the plurality of processing nodes to generate a final query result; and transmit, by the central coordinating processing node to the query source, the final query result.

8. The system of claim 7, wherein the local storage cache is stored in a local storage drive in communication with a corresponding node.

9. The system of claim 8, wherein the local storage drive comprises an SSD device.

10. The system of claim 7, wherein the local storage cache is stored on a file server or a network attached storage (NAS) device.

11. The system of claim 7, wherein the cloud database storage system includes Amazon S3.

12. The system of claim 7, wherein the plurality of processing nodes comprise epoch readers.

\* \* \* \* \*